United States Patent [19]

Harakawa et al.

[11] Patent Number: 6,099,968
[45] Date of Patent: Aug. 8, 2000

[54] WATER-BASE METALLIC PAINT COMPOSITION AND METHOD OF FORMING OVERCOAT

[75] Inventors: Hiromi Harakawa; Kenya Suzuki, both of Hiratsuka, Japan

[73] Assignee: Kansai Paint Company, Limited, Amagasaki, Japan

[21] Appl. No.: 09/341,878

[22] PCT Filed: Jan. 20, 1998

[86] PCT No.: PCT/JP98/00183

§ 371 Date: Jul. 19, 1999

§ 102(e) Date: Jul. 19, 1999

[87] PCT Pub. No.: WO98/31756

PCT Pub. Date: Jul. 23, 1998

[30] Foreign Application Priority Data

Jan. 21, 1997 [JP] Japan ..................................... 9-008748
Jun. 5, 1997 [JP] Japan ..................................... 9-147766

[51] Int. Cl.[7] ................................................ B32B 27/36
[52] U.S. Cl. .................. 428/414; 106/1.05; 106/287.22; 106/287.26; 106/287.29; 106/403; 427/383.1; 427/385.5; 427/386; 427/404; 427/407.1; 428/457; 428/480; 428/522; 428/689
[58] Field of Search .............................. 106/1.05, 287.22, 106/287.26, 287.29, 403; 427/383.1, 385.5, 386, 404, 407.1; 428/414, 457, 480, 522, 689

[56] References Cited

FOREIGN PATENT DOCUMENTS

| | | |
|---|---|---|
| 62-30167 | 2/1987 | Japan . |
| 2-49076 | 2/1990 | Japan . |
| 3-47875 | 2/1991 | Japan . |
| 4-25578 | 1/1992 | Japan . |
| 5-271580 | 10/1993 | Japan . |
| 6-128442 | 5/1994 | Japan . |
| 7-70483 | 3/1995 | Japan . |

*Primary Examiner*—Bernard Pianalto
*Attorney, Agent, or Firm*—Armstrong, Westerman, Hattori, McLeland & Naughton

[57] ABSTRACT

The present invention provides an aqueous metallic coating composition comprising (A) 100 parts, based on solids, of a film-forming aqueous acrylic polymer obtained by neutralizing a copolymer having a number average molecular weight of 2,000 to 200,000, an acid value of 10 to 110 mg KOH/g and a hydroxyl value of 20 to 100 mg KOH/g, the copolymer being obtained by copolymerizing (a) 10 to 35 wt. % of styrene, (b) 5 to 25 wt. % of $C_{6-18}$ alkyl (meth) acrylate, (c) 0.1 to 10 wt. % of phosphoric ester group-containing polymerizable unsaturated monomer represented by the general formula

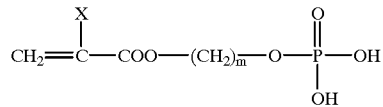

wherein X is a hydrogen atom or methyl, and m is an integer of 1 to 3, (d) 2 to 10 wt. % of carboxyl-containing polymerizable unsaturated monomer, (e) 5 to 20 wt. % of hydroxyl-containing polymerizable unsaturated monomer, and (f) 0 to 77.9 wt. % of other polymerizable unsaturated monomer, and (B) 2 to 100 parts by weight of a metallic flake pigment; and a method for forming a topcoat using the composition.

7 Claims, No Drawings

WATER-BASE METALLIC PAINT COMPOSITION AND METHOD OF FORMING OVERCOAT

FIELD OF THE INVENTION

The present invention relates to novel aqueous metallic coating compositions and methods for forming topcoats.

BACKGROUND ART

Metallic coating films sparkle when metallic flake pigments contained therein reflect incident light. The reflection, in combination with the colors of the coating films, produces an attractive, unique appearance full of variations. The metallic coating films are formed chiefly on exterior panels of automobiles, motorcycles, etc.

Conventional techniques for forming the metallic coating films include the 1-coat 1-bake technique comprising the steps of applying a metallic topcoat composition containing a metallic pigment on a substrate optionally coated with a primer or with a primer and intercoat, and heat-curing the metallic topcoat; the 2-coat 2-bake technique comprising the steps of applying and heat-curing a metallic coating composition, and applying and heat-curing a clear coating composition; the 2-coat 1-bake technique comprising the steps of applying a metallic coating composition and a clear coating composition in this order and heat-curing the two coats at the same time; and the 3-coat 2-bake techniques comprising the steps of applying a clear coating composition to the coating surface formed by the 2-coat 1-bake technique, followed by heat curing.

A metallic coating film having uniform metallic appearance without metallic mottling can be obtained by orientating the metallic flake pigment parallel to the coating surface and uniformly and regularly over the whole coated area, and by providing a metallic coating surface with excellent smoothness.

For satisfying these requirements, it is preferable to use a metallic coating composition which shows a high viscosity when applied to the surface of the substrate and whose film thickness after heat curing is significantly different from the film thickness immediately after application. That is, if the metallic coating composition shows a high viscosity when applied, the metallic pigment is difficult to flow and thus is prevented from causing metallic mottling, and if the film thickness after heat curing is greatly different from the film thickness immediately after application, the metallic pigment is readily orientated parallel to the coating surface.

Accordingly, low solids coating compositions containing a large proportion of organic solvent have been chiefly utilized as metallic coating compositions. In recent years, however, use of aqueous metallic coating compositions is strongly required from the viewpoints of prevention of environmental pollution and conservation of resource.

Although aqueous metallic coating compositions are not likely to cause problems such as environmental pollution, their finish appearances are not fully satisfactory since the evaporation amount of water as the medium changes according to variation of humidity at the time of application, altering the orientation of the metallic pigment.

Recently proposed aqueous metallic coating compositions include one comprising a phosphoric ester group- and alkylene oxide group-containing copolymer and a metallic pigment (Japanese Unexamined Patent Publication No. 25578/1992); and one comprising a phosphoric ester group- and hydroxyl group-containing copolymer and a metallic pigment (Japanese Unexamined Patent Publication No. 271580/1993). The publications discloses that these coating compositions prevent corrosion of metallic pigments.

The present inventors' research, however, found that the proposed aqueous metallic coating compositions have the defects of insufficient orientation of the metallic pigment, insufficient smoothness of the coating film, and unsatisfactory finish appearance.

DISCLOSURE OF THE INVENTION

An object of the present invention is to provide a novel aqueous metallic coating composition free from the above defects of the prior art, and a method for forming a topcoat using the composition.

Another object of the present invention is to provide an aqueous metallic coating composition capable of forming a metallic coating film having good metallic pigment orientation, good smoothness, and excellent finish appearance, independently of variation of humidity at the time of application.

These and other objects and features of the present invention will be apparent from the following description.

The present invention provides an aqueous metallic coating composition comprising (A) 100 parts by weight, based on solids, of a film-forming aqueous acrylic polymer obtained by neutralizing a copolymer having a number average molecular weight of 2,000 to 200,000, an acid value of 10 to 110 mg KOH/g and a hydroxyl value of 20 to 100 mg KOH/g, the copolymer being obtained by copolymerizing (a) 10 to 35 wt. % of styrene, (b) 5 to 25 wt. % of $C_{6-18}$ alkyl (meth)acrylate, (c) 0.1 to 10 wt. % of phosphoric ester group-containing polymerizable unsaturated monomer represented by the general formula

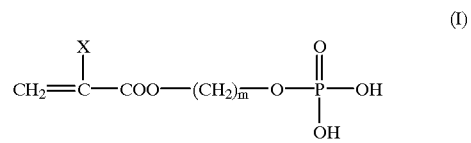

(I)

wherein X is a hydrogen atom or methyl, and m is an integer of 1 to 3, (d) 2 to 10 wt. % of a carboxyl-containing polymerizable unsaturated monomer, (e) 5 to 20 wt. % of hydroxyl-containing polymerizable unsaturated monomer and (f) 0 to 77.9 wt. % of other polymerizable unsaturated monomer; and (B) 2 to 100 parts by weight of a metallic flake pigment.

The present invention also provides a method for forming a topcoat comprising successively forming a colored base coat and a clear coat on a substrate, wherein the colored base coat is formed from the above aqueous metallic coating composition.

The present inventors did extensive research to accomplish the above objects, and found that an aqueous metallic coating composition comprising the above specified film-forming aqueous acrylic polymer having a phosphoric ester group, carboxyl group and hydroxyl group in the molecule, and a metallic flake pigment achieves the above objects and is capable of forming a metallic coating film excellent in finish appearance and film properties such as water resistance, independently of variation of humidity at the time of application.

The present inventions have been accomplished based on these novel findings.

The aqueous metallic coating composition and method for forming a topcoat according to the invention will be described below in further detail.

The film-forming aqueous acrylic polymer (A) for use in the coating composition of the invention has a number average molecular weight of 2,000 to 200,000, preferably 3,000 to 100,000, an acid value of 10 to 110 mg KOH/g, preferably 15 to 100 mg KOH/g, and a hydroxyl value of 20 to 100 mg KOH/g, preferably 25 to 90 mg KOH/g.

If the acrylic polymer has a number average molecular weight less than 2,000, the resulting composition is insufficient in application workability and curability. On the other hand, a number average molecular weight exceeding 200,000 results in too low a nonvolatile content at the time of application, impairing the application workability. When the acrylic polymer has an acid value less than 10 mg KOH/g, poor water dispersibility results, whereas an acid value exceeding 110 mg KOH/g reduces the water resistance of the coating film. An acrylic polymer having a hydroxyl value less than 20 mg KOH/g reduces the curability of the coating composition, whereas a hydroxyl value exceeding 100 mg KOH/g impairs the water resistance of the coating film.

The $C_{6-18}$ alkyl (meth)acrylate (b) may be, for example, hexyl (meth)acrylate, 2-ethylhexyl (meth)acrylate, n-octyl (meth)acrylate, decyl (meth)acrylate, lauryl (meth)acrylate, stearyl (meth)acrylate or like $C_{6-18}$ alkyl ester of acrylic or methacrylic acid. These monomers may be used singly or in combination.

The phosphoric ester group-containing polymerizable unsaturated monomer (c) may be, for example, (2-acryloyloxyethyl) acid phosphate, (2-methacyloyloxyethyl) acid phosphate, (2-acryloyloxypropyl) acid phosphate or (2-methacryloyloxypropyl) acid phosphate. These monomers can be used singly or in combination.

The carboxyl-containing polymerizable unsaturated monomer (d) may be, for example, acrylic acid, methacrylic acid, crotonic acid, itaconic acid, maleic acid, fumaric acid, 2-carboxyethyl (meth)acrylate or 2-carboxypropyl (meth) acrylate; or a polymerizable unsaturated monomer having a half-esterified acid anhydride group in the molecule. These monomers can be used singly or in combination.

The term "half-esterified acid anhydride group" as used herein means a group consisting of a carboxyl group and a carboxylate group, which is obtained by adding an aliphatic monohydric alcohol to an acid anhydride group for ring opening (i.e., half esterification). The half-esterified acid anhydride group is hereinafter sometimes referred to simply as "half ester group".

The half ester group-containing polymerizable unsaturated monomer can be easily obtained by half-esterifing an acid anhydride group-containing polymerizable unsaturated monomer.

Examples of acid anhydride group-containing polymerizable unsaturated monomers include maleic anhydride, itaconic anhydride, succinic anhydride and phthalic anhydride.

Aliphatic monohydric alcohols useful for half esterification include low-molecular monohydric alcohols such as methanol, ethanol, isopropanol, tert-butanol, isobutanol, methyl cellosolve and ethyl cellosolve. The half esterication can be carried out by conventional methods at a temperature between room temperature and about 80° C., optionally using a tertiary amine as a catalyst.

The hydroxyl-containing polymerizable unsaturated monomer (e) may be, for example, 2-hydroxyethyl (meth) acrylate, 2-hydroxypropyl (meth)acrylate, 3-hydroxypropyl (meth)acrylate, hydroxybutyl (meth)acrylate or like $C_{2-8}$ hydroxyalkyl ester of acrylic or methacrylic acid; a monoester of a polyether polyol such as polyethylene glycol, polypropylene glycol or polybutylene glycol with an unsaturated carboxylic acid such as (meth)acrylic acid; a monoether of a polyether polyol such as polyethylene glycol, polypropylene glycol or polybutylene glycol with a hydroxyl-containing unsaturated monomer such as 2-hydroxyethyl (meth)acrylate; a monoester or diester of an acid anhydride group-containing unsaturated compound such as maleic anhydride or itaconic anhydride with a glycol such as ethylene glycol, 1,6-hexanediol or neopentyl glycol; a hydroxyalkyl vinyl ether such as hydroxyethyl vinyl ether; allyl alcohol; an adduct of an α,β-unsaturated carboxylic acid with a monoepoxy compound such as "Cardula E10" (tradename, a product of Shell Petrochemical Co., Ltd.) or α-olefin epoxide; an adduct of glycidyl (meth)acrylate with a monobasic acid such as acetic acid, propionic acid, p-tert-butylbenzoic acid or an aliphatic acid; or an adduct of any one of the above hydroxyl-containing monomers with a lactone (e.g., ε-caprolactone or γ-valerolactone). These monomers can be used singly or in combination.

The other polymerizable unsaturated monomer (f) is a monomer copolymerizable with the monomers (a) to (e), such as a (meth)acrylic ester; vinyl ether or aryl ether; an olefin compound or diene compound; a hydrocarbon ring-containing unsaturated monomer; or a nitrogen-containing unsaturated monomer.

Examples of (meth)acrylic esters include methyl acrylate, ethyl acrylate, propyl acrylate, isopropyl acrylate, n-butyl acrylate, isobutyl acrylate, tert-butyl acrylate, methyl methacrylate, ethyl methacrylate, n-propyl methacrylate, isopropyl methacrylate, n-butyl methacrylate, isobutyl methacrylate, tert-butyl methacrylate and like $C_{1-24}$ alkyl esters of acrylic or methacrylic acid (other than those used as the monomer (b)); methoxybutyl acrylate, methoxybutyl methacrylate, methoxyethyl acrylate, methoxyethyl methacrylate, ethoxybutyl acrylate, ethoxybutyl methacrylate and like $C_{2-18}$ alkoxyalkyl esters of acrylic or methacrylic acid.

Examples of vinyl ethers and aryl ethers include ethyl vinyl ether, n-propyl vinyl ether, isopropyl vinyl ether, butyl vinyl ether, tert-butyl vinyl ether, pentyl vinyl ether, hexyl vinyl ether, octyl vinyl ether and like linear alkyl vinyl ethers; cyclopentyl vinyl ether, cyclohexyl vinyl ether and like cycloalkyl vinyl ethers; phenyl vinyl ether, trivinyl ether and like aryl vinyl ethers; benzyl vinyl ether, phenethyl vinyl ether and like, aralkyl vinyl ethers; and allyl glycidyl ether, allyl ethyl ether and like allyl ethers.

Examples of olefin compounds and diene compounds include ethylene, propylene, butylene, vinyl chloride, butadiene, isoprene and chloroprene.

Examples of hydrocarbon ring-containing unsaturated monomers include α-methylstyrene, phenyl (meth)acrylate, phenylethyl (meth)acrylate, phenylpropyl (meth)acrylate, benzyl (meth)acrylate, phenoxyethyl (meth)acrylate, cyclohexyl (meth)acrylate, 2-acryloyloxyethyl-hydrogen phthalate, 2-acryloyloxypropyl-hydrogen phthalate, 2-acryloyloxypropylhexahydrohydrogen phthalate, 2-acryloyloxypropyltetrahydrohydrogen phthalate, esters of p-tert-butyl-benzoic acid with hydroxyethyl (meth)acrylate, and dicyclopentenyl (meth)acrylate.

Examples of nitrogen-containing unsaturated monomers include N,N-dimethylaminoethyl (meth)acrylate, N,N-diethylaminoethyl (meth)acrylate, N-tert-butylaminoethyl (meth)acrylate and like nitrogen-containing alkyl (meth) acrylates; acrylamide, methacrylamide, N-methyl (meth)

acrylamide, N-ethyl (meth)acrylamide, N,N-dimethyl (meth)acrylamide, N,N-dimethylaminopropyl (meth) acrylamide, N,N-dimethylaminoethyl (meth)acrylamide and like polymerizable amides; 2-vinylpyridine, 1-vinyl-2-pyrrolidone, 4-vinylpyridine and like aromatic nitrogen-containing monomers; acrylonitrile, methacrylonitrile and like polymerizable nitriles; and allylamines.

The monomers (a) to (f) can be copolymerized by conventional methods for copolymerizing polymerizable unsaturated monomers. The most suitable method is solution radical polymerization in an organic solvent, in view of application range and cost. More specifically, the desired polymer can be easily obtained by copolymerization at about 60 to 150° C. in an organic solvent in the presence of a polymerization initiator such as azobisisobutyronitrile or benzoyl peroxide. Examples of useful organic solvents include aromatic solvents such as xylene and toluene; ketone solvents such as methyl ethyl ketone and methyl isobutyl ketone; ester solvents such as ethyl acetate, butyl acetate, isobutyl acetate and 3-methoxybutyl acetate; and alcohol solvents such as n-butanol and isopropyl alcohol.

The monomers (a) to (f) are copolymerized in the following proportions based on the total weight of these monomers. The proportion of the styrene (a) is 10 to 35 wt. %, preferably 15 to 30 wt. %. A proportion less than 10 wt. % results in a coating composition having a reduced viscosity at the time of application and thus having impaired application workability, whereas a proportion exceeding 35 wt. % reduces the water dispersibility. The proportion of the monomer (b) is 5 to 25 wt. %, preferably 10 to 20 wt. %. A proportion less than 5 wt. % results in a coating composition having a reduced viscosity at the time of application and thus having impaired application workability, whereas a proportion exceeding 25 wt. % lowers the water dispersibility. The proportion of the monomer (c) is 0.1 to 10 wt. %, preferably 0.5 to 8 wt. %. A proportion less than 0.1 wt. % impairs the storage stability of the coating composition, whereas a proportion exceeding 10 wt. % results in a coating film having reduced water resistance. The proportion of the monomer (d) is 2 to 10 wt. %, preferably 3 to 9 wt. %. A proportion less than 2 wt. % reduces the water dispersibility, whereas a proportion exceeding 10 wt. % results in a coating film having lower water resistance. The proportion of the monomer (e) is 5 to 20 wt. %, preferably 8 to 18 wt. %. A proportion less than 5 wt. % results in a coating composition having poor curability, whereas a proportion exceeding 20 wt. % reduces the water resistance of the coating film. The monomer (f) is used in an amount to make 100 wt. % of the total amount of the monomers (a) to (f), i.e., 0 to 77.9 wt. %, preferably 15 to 63.5 wt. %.

The film-forming aqueous acrylic polymer (A) for use in the invention can be obtained by naturalizing, in an ordinary manner, an acrylic polymer prepared by copolymerizing the monomers (a) to (f), to make the polymer aqueous. Specifically, at least part of acidic groups of the acrylic polymer obtained by copolymerization of monomers (a) to (f) are neutralized to obtain a water-soluble or water-dispersible polymer. A suitable neutralization equivalent is usually about 0.3 to 1.5. Useful neutralizing agents include alkaline substances such as sodium hydroxide; and various amines such as monomethylamine, dimethylamine, trimethylamine, triethylamine, diisopropyl amine, monoethanolamine, diethanol amine and dimethylethanol amine.

The metallic flake pigment (B) for use in the coating composition of the invention may be a flake pigment such as an aluminum pigment, bronze pigment, mica, gold pigment or silver pigment. At least one of these pigments is incorporated in the composition. The proportion of the metallic pigment is about 2 to 10 parts by weight per 100 parts by weight, based on solids, of the film-forming aqueous acrylic polymer (A).

The coating composition of the invention may contain a film-forming aqueous polyester polymer (C), in addition to the film-forming aqueous acrylic polymer (A), so as to improve film properties such as flexibility and adhesion.

The polyester polymer (C) is obtained by neutralizing a carboxyl-containing polyester polymer to make the polymer aqueous, and has a number average molecular weight of 1,000 to 100,000, preferably 1,000 to 50,000, an acid value of 10 to 50 mg KOH/g, preferably 15 to 50 mg KOH/g, and a hydroxyl value of 20 to 150 mg KOH/g, preferably 20 to 100 mg KOH/g.

If the number average molecular weight of the polyester polymer (C) is less than 1,000, the resulting composition is insufficient in application workability and curability, whereas if the number average molecular weight exceeds 100,000, the resulting composition has too low a nonvolatile content at the time of application and thus has poor application workability. If the acid value of the polyether polymer (C) is less than 10 mg KOH/g, impaired water dispersibility results, whereas an acid value exceeding 50 mg KOH/g yields a coating film having reduced water resistance. If the hydroxyl value of the polyester polymer (C) is less than 20 mg KOH/g, the resulting composition has poor curability, whereas a hydroxyl values exceeding 150 mg KOH/g results in a coating film having reduced water resistance.

The carboxyl-containing polyester polymer can be easily obtained by condensation reaction of a polyhydric alcohol such as ethylene glycol, butylene glycol, 1,6-hexanediol, trimethylolpropane or pentaerythritol with a polycarboxylic acid such as adipic acid, terephthalic acid, isophthalic acid, phthalic anhydride or hexahydrophthalic anhydride. For example, the carboxyl-containing polyester polymer can be obtained by one-step reaction using a reaction system containing excess carboxyl groups of the polycarboxylic acid, or by a reaction using a reaction system containing excess hydroxyl groups of the polyhydric alcohol to give a hydroxyl-terminated polyester polymer, followed by an addition reaction of the polymer with an acid anhydride group-containing compound such as phthalic anhydride, hexahydrophthalic anhydride or succinic anhydride.

The film-forming aqueous polyester polymer (C) can be obtained by neutralizing, in an ordinary manner, at least part of the acidic groups of the polyester polymer to obtain a water-soluble or water-dispersible polymer. A suitable neutralization equivalent is usually about 0.3 to 1.5. Useful neutralizing agents include alkaline substances such as sodium hydroxide; and various amines such as monomethylamine, dimethylamine, trimethylamine, triethylamine, diisopropyl amine, monoethanolamine, diethanol amine and dimethylethanol amine.

The coating composition of the invention may contain, in addition to the film-forming aqueous acrylic polymer (A), a compound (D) containing at least two alicyclic epoxy groups in the molecule. When the compound (D) is used in combination with the polymer (A), the alicyclic epoxy groups in the compound (D) readily react with acidic groups, i.e., phosphoric ester group and carboxyl group, in the polymer (A), so that the water resistance of the coating film is further increased. Moreover, as a result of the reaction, the coating film is crosslinked and becomes a higher-molecular one, and thus the flexibility, hardness and other properties of the coating film are improved.

The alicyclic epoxy group in the compound (D) comprises two adjacent carbon atoms which form an alicyclic hydrocarbon skeleton ring. The alicyclic hydrocarbon skeleton may be a 4- to 10-membered, preferably 5- to 6-membered saturated hydrocarbon ring, or a condensed hydrocarbon ring composed of two or more such rings, or a bridged hydrocarbon ring composed of two or more such rings bridged with an alkylene or like group.

Specific compounds usable as the alicyclic epoxy compound (D) include those represented by the following formulas:

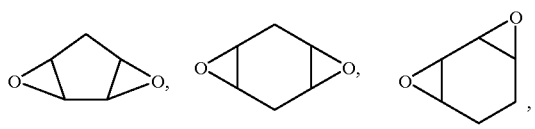

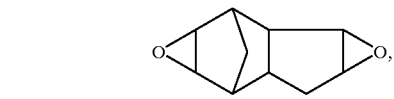

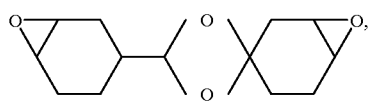

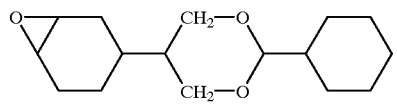

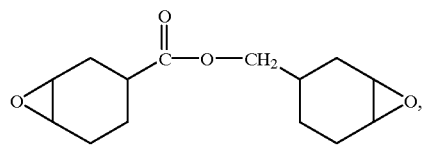

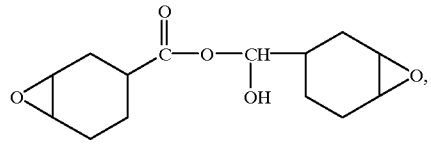

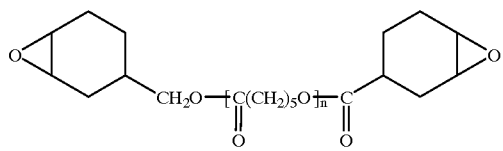

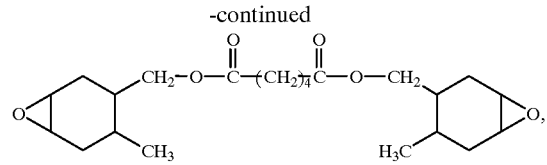

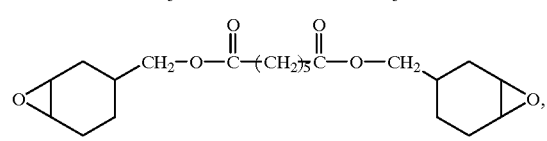

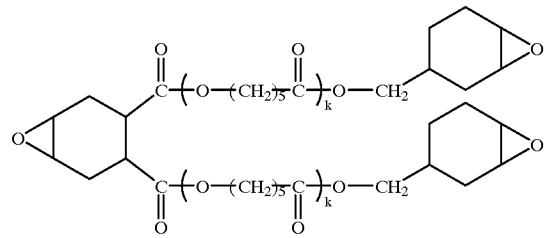

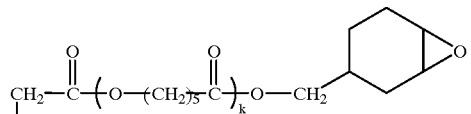

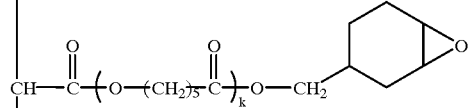

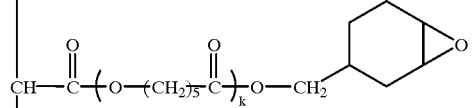

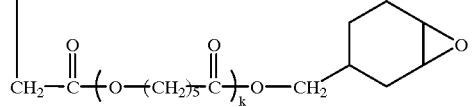

wherein n is an integer of 1 to 8, and k is an integer of 0 to 15.

Alicyclic epoxy compounds usable as the component (D) also include polymers obtained from compounds having an alicyclic epoxy group and a polymerizable unsaturated bond in the molecule.

Examples of the compounds having an alicyclic epoxy group and a polymerizable unsaturated bond in the molecule include polymerizable epoxy monomers represented by the following formulas (1) to (12):

(1)
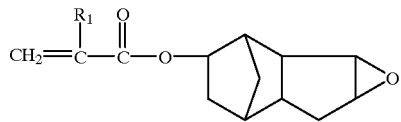
(2)
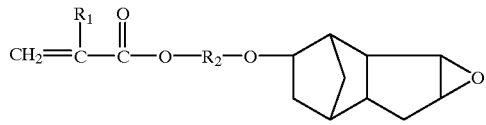
(3)
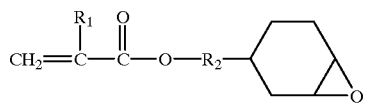
(4)
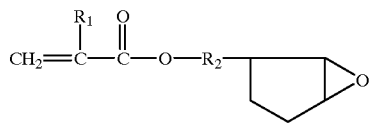
(5)
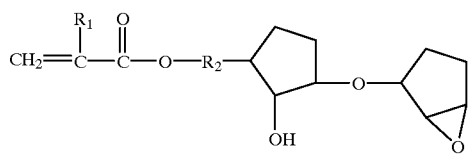
(6)
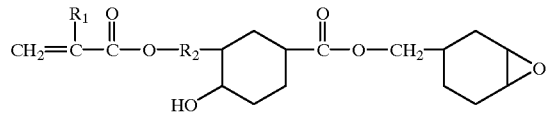
(7)
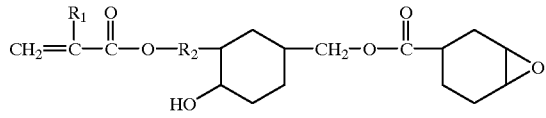
(8)
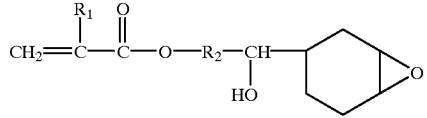
(9)
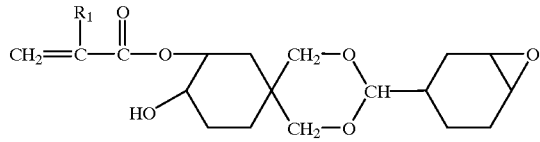
(10)
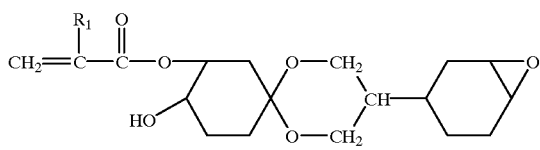

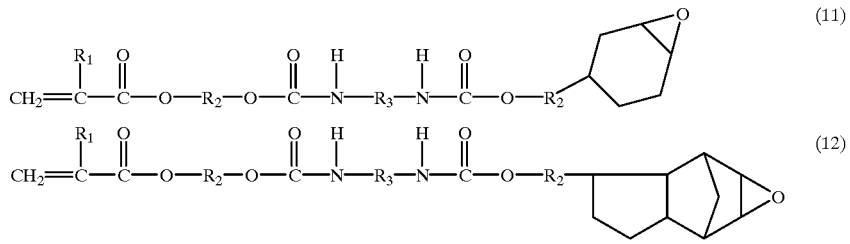

wherein $R_1$ is a hydrogen atom or methyl, $R_2$ is a $C_{1-6}$ bivalent aliphatic saturated hydrocarbon group, and $R_3$ is a $C_{1-10}$ bivalent hydrocarbon group.

In the polymerizable epoxy monomer, the $C_{1-6}$ bivalent aliphatic saturated hydrocarbon group represented by $R_2$ may be, for example, a straight- or branched-chain alkylene group such as methylene, ethylene, propylene, tetramethylene, ethylethylene, pentamethylene or hexamethylene. The $C_{1-10}$ bivalent hydrocarbon group represented by $R_3$ may be, for example, methylene, ethylene, propylene, tetramethylene, ethylethylene, pentamethylene, hexamethylene, polymethylene, phenylene,

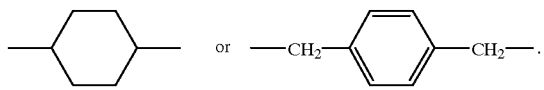

Specific examples of polymerizable epoxy monomers represented by the formulas (1) to (12) include 3,4-epoxycyclohexylmethyl methacrylate and 3,4-epoxycyclohexylmethyl acrylate. Commercial products of these monomers include, for example, "METHB" and "AETHB" (tradenames, products of Daicel Chemical Industries, Co., Ltd.). 4-Vinylhexene oxide is also usable as the polymerizable epoxy monomer.

The polymer as the component (D) can be prepared by polymerizing at least one monomer selected from the above polymerizable epoxy monomers, optionally together with other polymerizable unsaturated monomer.

The other polymerizable unsaturated monomer can be selected from a wide range according to the properties required of the resulting polymer. Typical examples of usable monomers are as follows:

(a) Esters of Acrylic or Methacrylic Acid

For example, methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and like $C_{1-18}$ alkyl esters of (meth) acrylic acid; methoxybutyl (meth)acrylate, methoxyethyl (meth)acrylate, ethoxybutyl (meth)acrylate and like $C_{2-18}$ alkoxyalkyl esters of (meth)acrylic acid; allyl (meth)acrylate and like $C_{2-8}$ alkenyl esters of (meth)acrylic acid; and hydroxyethyl (meth)acrylate, hydroxypropyl (meth)acrylate and like $C_{2-8}$ hydroxy alkyl esters of (meth)acrylic acid.

(b) Vinyl Aromatic Compounds

For example, styrene, a-methyl styrene, vinyl toluene and p-chlorostyrene.

(c) Polyolefin Compounds

For example, butadiene, isoprene and chloroprene.

(d) Other Compounds

For example, acrylonitrile, methacrylonitrile, methylisopropenylketone, vinyl acetate, "VeoVa monomer" (tradename, a product of Shell Chemical Co.), vinyl propionate, vinyl pivalate, vinyl compounds having a polycaprolactone chain (such as "FM-3X Monomer" manufactured by Daicel Chemical, Co., Ltd.).

The proportions of the polymerizable epoxy monomer and other polymerizable unsaturated monomer can be suitably selected according to the purpose, within a range such that the component (D) obtained by the copolymerization of these monomers has at least 2, preferably at least 3, more preferably at least 4 alicyclic epoxy groups in the molecule. For imparting sufficient crosslinking properties, it is suitable that the proportion of the polymerizable epoxy monomer be 5 to 100 wt. %, preferably 20 to 100 wt. %, based on the solids of the component (D).

The polymer as the component (D) can be prepared by using conventional methods and conditions for polymerization based on polymerizable unsaturated bonds of acrylic resins, vinyl resins or like resins. An example of such polymerization comprises dissolving or dispersing the monomers in an organic solvent, and heating the solution or dispersion in the presence of a radical polymerization initiator at about 60 to 180° C. usually for about 1 to 10 hours with stirring. Useful organic solvents include alcohol solvents, ether solvents, ester solvents and hydrocarbon solvents. The hydrocarbon solvents, when employed, are preferably used in combination with other solvent, from the viewpoint of dissolving power. The radical polymerization initiator may be any of those conventionally used, for example, benzoyl peroxide, t-butylperoxy-2-ethylhexanoate and like peroxides; azobisisobutylonitrile, azobisdimethylvaleronitrile and like azo compounds.

It is preferable that the alicyclic epoxy compound (D) is highly compatible with the components (A) and (C) and stable in water. In view of this matter, it is suitable that the compound (D) has a number average molecular weight of about 90 to 50,000, preferably about 200 to 5,000, and contains 2 to 200 alicyclic epoxy groups per molecule. A number average molecular weight exceeding about 50,000 is not preferable since the resulting composition is likely to have decreased storage stability. If the number of alicyclic epoxy groups exceeds about 200, the coating film of the resulting composition may have reduced smoothness, hence undesirable.

Further, if a compound having, in the molecule, two or more epoxy groups other than the alicyclic epoxy groups is used, the resulting composition has insufficient storage stability. Thus, use of such compound is not preferable in this invention.

The aqueous metallic coating composition of the invention is suitable as a colored base coat composition used in the method for forming a topcoat comprising successively forming a colored base coat and a clear coat on a substrate. The composition comprises water as a medium, the film-forming aqueous acrylic polymer (A) and metallic flake pigment (B) as essential components, and when required, known additives such as a water-dispersible resin, color pigment, extender pigment, organic solvent, viscosity modifier, UV screener, defoaming agent and surface modifier.

Examples of water-dispersible resins usable as the optional component include acrylic-, polyester- or polyurethane-based, water-dispersible resins prepared by known methods.

The aqueous metallic coating composition of the invention is usually used as a curable aqueous coating composition containing a curing agent. Melamine resins are generally used as the curing agent. Preferred melamine resins are water-soluble melamine resins, such as "Cymel-303", "Cymel-325" and "Cymel-370" available from Mitsui Toatsu Chemicals, Inc. and "Suminal N-W" available from Sumitomo Chemical, Co., Ltd. Usable melamine resins are not limited to those exemplified above and include water-insoluble melamine resins. The melamine resin is used in a proportion of 5 to 200 wt. % based on the solids of the film-forming aqueous acrylic polymer (A). If the proportion of the melamine resin is excessively small, the resulting composition has insufficient curability, whereas if the proportion is excessively large, the cured film becomes too hard and brittle.

The aqueous metallic coating composition of the invention can be obtained by mixing the components (A) and (B) and other optional components, and adding deionized water and, where necessary, an organic solvent or the like in an ordinary manner to adjust the solids content and viscosity of the composition to about 10 to 40 wt. % and about 15 to 60 seconds (Ford cup #4, 20° C.), respectively.

The curable aqueous coating composition is applied to various substrates by conventional methods, and heated usually at about 100 to 180° C. for about 10 to 60 minutes, so that the composition is sufficiently cured and forms a coating film having good finish appearance.

The method for forming a topcoat according to the invention comprises successively forming a colored base coat and a clear coat on a substrate, wherein the colored base coat is formed from the aqueous metallic coating composition of the invention.

Specific examples of substrates for forming the topcoat include steel panels treated by chemical conversion, electrophoretically coated with a primer and optionally coated with an intercoat; various plastic substrates optionally surface-treated and coated with a primer and an intercoat; and composites of these substrates.

The method of the invention is particularly suitable for forming a topcoat on automotive exterior panels. The method can be carried out according to the techniques known in automotive industries, for example, the 2-coat 1-bake or 2-coat 2-bake technique for forming a colored base coat/clear coat; and the 3-coat 1-bake or 3-coat 2-bake technique for forming a colored base coat/clear coat/clear coat. Among these techniques, the 2-coat 1-bake technique is preferred, considering the factors such as the number of coating steps, finish appearance of the metallic coating film and film properties.

Described below is the 2-coat 1-bake technique using the aqueous metallic coating composition of the invention as a colored base coat composition.

In the 2-coat 1-bake technique, the colored base coat composition is first applied to the substrate by conventional coating methods such as spray coating.

The apparatus for spray coating may be any of those conventionally used, such as air spray guns, airless spray guns, air spray electrostatic coaters, airless spray electrostatic coaters and rotary atomizing electrostatic coaters.

The colored base coat composition is applied preferably to a thickness of about 10 to 30 μm (when cured). The colored base coat composition thus applied is left to stand at room temperature for a few minutes or is force-dried at about 50 to 80° C. for a few minutes, and then coated with a clear coat composition.

The clear coat composition may be a coating composition known per se and conventionally used for forming a topcoat. Examples of known clear coat compositions include those comprising curable resin components such as acrylic resin/amino resin mixtures, alkyd resin/amino resin mixtures, polyester resin/amino resin mixtures, acrylic resin/polyisocyanate mixtures, alkyd resin/polyisocyanate mixtures and polyester resin/polyisocyanate mixtures. The amino resins used in these mixtures are, for example, melamine resins. These known clear coat compositions are not limited by their forms and include, for example, organic solvent-based compositions, nonaqueous dispersions, aqueous solutions, aqueous dispersions, high solids compositions and powders.

Usable techniques and apparatus for applying the clear coat composition are the same as those for applying the colored base coat composition.

The clear topcoat composition is applied preferably to a thickness of about 20 to 80 μm (when cured).

The colored base coat and clear coat thus formed are, cured at the same time by heating preferably at about 100 to 180° C. for about 10 to 60 minutes.

Articles coated by the method of the invention have a coating film having good metallic pigment orientation and excellent finish appearance, and are suitable in particular as automotive exterior panels.

The present invention is remarkably advantageous in that it provides a novel aqueous metallic coating composition having good application workability and capable of forming a metallic coating film excellent in finish appearance characteristics such as metallic pigment orientation and smoothness, since its viscosity at the time of application is substantially independent of the humidity of the environment; and a method of forming a topcoat using the composition.

BEST MODE FOR CARRYING OUT THE INVENTION

The present invention will be described below in more detail with reference to Preparation Examples, Examples and Comparative Examples, wherein the parts and percentages are all by weight.

Preparation Examples 1 to 9

Preparation of Acrylic Polymer 60 parts of butyl cellosolve was placed in a 5-liter glass flask equipped with a stirrer, thermometer and condenser, and heated to 85° C. in an electric heating mantle. At the same temperature, a mixture of 100 parts of the monomer mixture shown in Table 1, and 3 parts of azobisdimethylvaleronitrile was added dropwise at a uniform rate over a period of 3 hours, followed by 1-hour aging. Thereafter, a mixture of 10 parts of butyl cellosolve and 1 part of azobisdimethylvaleronitrile was further added dropwise over a period of 1 hour, followed by 1-hour aging. Then, 5 parts of butyl cellosolve and 9.22 parts of dimethylethanol amine were added, giving acrylic polymer solutions (i) to (vii).

Table 1 shows the resin solids contents of the polymer solutions (i) to (vii), and the number average molecular weights, acid values and hydroxyl values of the resins.

TABLE 1

| Preparation Example | 1 | 2 | 3 | 4 | 5 | 6 | 7 |
|---|---|---|---|---|---|---|---|
| Monomer | | | | | | | |
| (a) Styrene | 30 | 30 | | 30 | 30 | 30 | 30 |
| (b) 2-Ethylhexyl methacrylate | 20 | | 20 | | 20 | 20 | 20 |
| Stearyl methacrylate | | 20 | | | | | |
| (c) Light Ester PM (*1) | 3 | 3 | 3 | 3 | | 3 | 3 |
| (d) Acrylic acid | 5.4 | 5.4 | 5.4 | 5.4 | 7.5 | | 5.4 |
| (e) 2-Hydroxyethyl acrylate | 10 | 10 | 10 | 10 | 10 | 10 | 25 |
| (f) Methyl methacrylate | | | | 30 | | | |
| n-Butyl acrylate | | | | | 7 | | |
| n-Butyl methacrylate | 31.6 | 31.6 | 31.6 | 44.6 | 32.5 | 37.0 | 16.6 |
| Produced resin | | | | | | | |
| Polymer solution number | (i) | (ii) | (iii) | (iv) | (v) | (vi) | (vii) |
| Solid content (%) | 53.8 | 54.0 | 54.3 | 53.9 | 53.7 | 53.9 | 53.8 |
| Number average molecular weight | 20,000 | 20,000 | 19,000 | 20,000 | 20,000 | 21,000 | 20,000 |
| Acid value (mg KOH/g) | 57.1 | 57.3 | 57.5 | 58.0 | 58.2 | 16.0 | 57.6 |
| Hydroxyl value (mg KOH/g) | 48 | 48 | 48 | 48 | 48 | 48 | 121 |

In Table 1, Light Ester PM (tradename, a product of Kyoeisha Chemical Co., Ltd.) is (2-methacryloyloxyethyl) acid phosphate.

Preparation Example 10
Preparation of Polyester Polymer 39.3 parts of neopenthyl glycol, 12.8 parts of trimethylolpropane, 27.3 parts of adipic acid and 34.9 parts of isophthalic acid were placed in a reaction vessel, heated to 160° C., and then heated to 230° C. over a period of 3 hours. The resulting mixture was maintained at 230° C. for 1 hour. Then, 5 parts of toluene was added and the reaction was allowed to proceed until the acid value became 2 mg KOH/g. The toluene was removed under reduced pressure, and the reaction temperature was lowered to 170° C. 5.05 parts of trimellitic acid was added, and the reaction was allowed to proceed for 30 minutes. Thereafter, 40 parts of diethylene glycol monobutyl ether was added, the temperature was lowered to 80° C., and 4.76 parts of dimethylethanol amine was added, giving a polyester polymer solution (viii).

The obtained polymer solution (viii) had a resin solids content of 70%, and the resin had a number average molecular weight of 3,000, an acid value of 30 mg KOH/g, and a hydroxyl value of 116 mg KOH/g.

Preparation Example 11
Preparation of Acrylic Resin Emulsion

A monomer emulsion was prepared by mixing 47 parts of styrene, 47 parts of n-butyl acrylate, 5 parts of 1,6-hexanediol diacrylate, 1 part of acrylic acid, 1 part of 60% "Newcol 562 SF" (tradename, a surfactant manufactured by Nihon Nyukazai K. K.), 70 parts of deionized water and 0.2 parts of ammonium persulfate.

110 parts of deionized water and 1.5 parts of 60% "Newcol 562SF" were placed in a reaction vessel and heated to 85° C. in a nitrogen stream. Added thereto was 5 parts of the above obtained monomer emulsion and a polymerization initiator solution consisting of 5 parts of deionized water and 0.15 parts of ammonium persulfate. After 30 minutes, the remainder of the monomer emulsion was placed into the reaction vessel over a period of 3 hours using a metering pump, followed by 2-hour aging. Then, 1 part of dimethylethanol amine was added, giving an acrylic resin emulsion (ix) having a resin solids content of 35% and a resin acid value of 7.8 mg KOH/g.

Example 1
Preparation of Aqueous Metallic Coating Composition (A-1)

Mixed were 15 parts of butyl cellosolve and 16.7 parts (solids content: 10 parts) of 60% "Aluminum Paste No. 7680WX" (tradename, an aluminum flake pigment manufactured by Toyo Aluminium K. K.).

To the mixture were added 83.3 parts (solids content: 45 parts) of the acrylic polymer solution (i) obtained in Preparation Example 1, 28.4 parts (solids content: 25 parts) of 88% "Cymel 370" (tradename, a melamine resin manufactured by Mitsui Cytec, Ltd.) and 85.7 parts (solids content: 30 parts) of the acrylic resin emulsion (ix) obtained in Preparation Example 11. The resulting mixture was diluted with deionized water to a solids content of 30%.

Further added thereto was 40.3 parts of a previously prepared mixture of 7.14 parts (solids content: 2 parts) of 28% "Primal ASE-60" (tradename, a thickener manufactured by Japan Acryl Chemical Co., Ltd.), 32.8 parts of deionized water and 0.3 parts of dimethylethanol amine, and 5 parts of 2-ethylhexyl alcohol. The resulting mixture was diluted with deionized water to a viscosity of 40 seconds (Ford cup #4, 20° C.), giving an aqueous metallic coating composition (A-1) of the present invention.

Examples 2 to 4 and Comparative Examples 1 to 5
Preparation of Aqueous Metallic Coating Compositions (A-2) to (A-11)

The procedure for preparation of the aqueous metallic coating composition (A-1) was followed except for using the acrylic polymer solutions, polyester polymer solution, acrylic resin emulsion, alicyclic epoxy compound and "Cymel 370" in the proportions shown in Table 2, giving aqueous metallic coating compositions (A-2) to (A-4) of the invention and comparative aqueous metallic coating compositions (A-5) to (A-9).

TABLE 2

| Aqueous Metallic coating composition | A-1 | A-2 | A-3 | A-4 | A-5 | A-6 | A-7 | A-8 | A-9 |
|---|---|---|---|---|---|---|---|---|---|
| Component (solids content, part) | | | | | | | | | |
| Acrylic polymer solution (i) | 45 | 35 | | 40 | | | | | |
| Acrylic polymer solution (ii) | | | 35 | | | | | | |
| Acrylic polymer solution (iii) | | | | | 35 | | | | |
| Acrylic polymer solution (iv) | | | | | | 35 | | | |
| Acrylic polymer solution (v) | | | | | | | 35 | | |
| Acrylic polymer solution (vi) | | | | | | | | 35 | |
| Acrylic polymer solution (vii) | | | | | | | | | 35 |
| Polyester polymer solution (viii) | | 25 | 25 | | 25 | 25 | 25 | 25 | 25 |
| Acrylic resin emulsion (ix) | 30 | 15 | 15 | 30 | 15 | 15 | 15 | 15 | 15 |
| ERL-4299 (*2) | | | | 5 | | | | | |
| Cymel-370 | 25 | 25 | 25 | 25 | 25 | 25 | 25 | 25 | 25 |

In Table 2, ERL-4299 (*2) is the tradename of an alicyclic epoxy compound manufactured by Union Carbide Corp. and represented by the formula

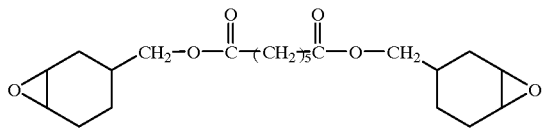

Examples 5 to 8 and Comparative Examples 6 to 10

A steel panel (JIS G3141, measuring 400×300×0.8 mm) which had been degreased and treated with zinc phosphate, was electrophoretically coated with a cationic electrodeposition coating composition "Elecron 9400 HB" (tradename, a product of Kansai Paint Co., Ltd., comprising a cationic epoxy-based resin and a blocked polyisocyanate compound as a curing agent) to a thickness of 20 μm (when cured) in an ordinary manner, heated at 170° C. for 20 minutes for crosslinking and curing. The cured film was polished with #400 sand paper and degreased by wiping with petroleum benzene. Then, an intercoat composition "Luga Bake Intercoat" (tradename, a polyester resin- and amino resin-based, organic solvent-type coating composition manufactured by Kansai Paint Co., Ltd.) was air-sprayed on the electrodeposition coating surface to a thickness of 25 μm (when cured). The coat was heated at 140° C. for 30 minutes for crosslinking and curing, polished with #400 sand paper, dehydrated and degreased by wiping with petroleum benzene. Several test substrates were prepared in this manner.

The aqueous metallic coating compositions (A-1) to (A-9) were applied to the respective test substrates to a thickness of 20 μm (when cured), using a bell-type rotary atomizer, while changing the humidity in the booth. Each coated test substrate was allowed to stand for 1 minute in the booth, and heated at 80° C. for 10 minutes in a circulating hot air oven to vaporize substantially all the volatile components. Then, the coat was cooled to room temperature, and a heat-curable clear coating composition "Magicron Clear TC-71" (tradename, an acrylic resin- and amino resin-based, organic solvent-type coating composition manufactured by Kansai Paint Co., Ltd.) was applied to the coating surface to a thickness of 40 μm (when cured) using a bell-type rotary atomizer. The two coats were cured at the same time by heating at 140° C. for 30 minutes, giving a topcoat.

The coating films thus formed were tested for properties by the following test methods.

Metallic effect: The IV values of the coating films were determined using "ALCOPE LMR 100" (tradename, a product of Fuji Kogyo K. K.). The greater the IV value, the higher the metallic effect.

Smoothness: The smoothness was determined using a tension meter manufactured by RENAULT. The greater the measured value, the higher the smoothness.

Image sharpness: The image sharpness was determined using "P.G.D.-IV", an apparatus for measuring sharpness-of-image gloss, manufactured by Japan Color Research Institute. The greater the measured value, the higher the image sharpness.

Appearance: The coating film was visually inspected for after tack and metallic mottling caused by mixing of the two coating layers or other factors, and evaluated on the following scale:
A: No metallic mottling,
B: Slight metallic mottling,
C: Marked metallic mottling.

Water resistance: The test coated panel was immersed in water at 40° C. for 240 hours and washed with cold water. The coating surface was visually inspected and evaluated on the following scale:
A: No abnormalities,
B: Slight fog,
C: Blushing.

Table 3 shows the results of the film property tests.

TABLE 3

| Example | 5 | 6 | 7 | 8 |
|---|---|---|---|---|
| Aqueous metallic coating comp. | A-1 | A-2 | A-3 | A-4 |
| Metallic effect | | | | |
| Humidity 60% | 225 | 230 | 220 | 230 |
| Humidity 70% | 220 | 220 | 220 | 215 |
| Humidity 80% | 208 | 215 | 200 | 207 |
| Smoothness | | | | |
| Humidity 60% | 19 | 19 | 19 | 19 |
| Humidity 70% | 19 | 20 | 19 | 20 |
| Humidity 80% | 20 | 20 | 19 | 20 |
| Image sharpness | | | | |
| Humidity 60% | 1.0 | 1.0 | 1.0 | 1.0 |
| Humidity 70% | 1.0 | 1.0 | 1.0 | 1.0 |

TABLE 3-continued

| | | | | |
|---|---|---|---|---|
| Humidity 80% Appearance | 1.0 | 1.0 | 1.0 | 1.0 |
| Humidity 60% | A | A | A | A |
| Humidity 70% | A | A | A | A |
| Humidity 80% | A | A | A | A |
| Water resistance | | | | |
| Humidity 60% | A | A | A | A |
| Humidity 70% | A | A | A | A |
| Humidity 80% | A | A | A | A |

| Comparative Ex. | 6 | 7 | 8 | 9 | 10 |
|---|---|---|---|---|---|
| Aqueous metallic coating comp. | A-5 | A-6 | A-7 | A-8 | A-9 |
| Metallic effect | | | | | |
| Humidity 60% | 203 | 190 | 188 | 120 | 220 |
| Humidity 70% | 172 | 170 | 165 | 120 | 210 |
| Humidity 80% | 160 | 158 | 132 | 120 | 198 |
| Smoothness | | | | | |
| Humidity 60% | 18 | 18 | 18 | 10 | 19 |
| Humidity 70% | 19 | 18 | 19 | 10 | 19 |
| Humidity 80% | 20 | 20 | 19 | 10 | 20 |
| Image sharpness | | | | | |
| Humidity 60% | 0.8 | 0.8 | 0.8 | 0.2 | 0.9 |
| Humidity 70% | 0.9 | 0.9 | 0.9 | 0.2 | 1.0 |
| Humidity 80% | 0.9 | 0.9 | 1.0 | 0.2 | 1.0 |
| Appearance | | | | | |
| Humidity 60% | A | A | B | C | A |
| Humidity 70% | B | B | B | C | A |
| Humidity 80% | B | B | B | C | A |
| Water resistance | | | | | |
| Humidity 60% | A | A | A | A | B |
| Humidity 70% | A | A | A | A | B |
| Humidity 80% | A | A | A | A | B |

What is claimed is:

1. An aqueous metallic coating composition comprising (A) 100 parts, based on solids, of a film-forming aqueous acrylic polymer obtained by neutralizing a copolymer having a number average molecular weight of 2,000 to 200,000, an acid value of 10 to 110 mg KOH/g and a hydroxyl value of 20 to 100 mg KOH/g, the copolymer being obtained by copolymerizing (a) 10 to 35 wt. % of styrene, (b) 5 to 25 wt. % of $C_{6-18}$ alkyl (meth)acrylate, (c) 0.1 to 10 wt. % of phosphoric ester group-containing polymerizable unsaturated monomer represented by the general formula

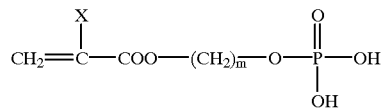

wherein X is a hydrogen atom or methyl, and m is an integer of 1 to 3, (d) 2 to 10 wt. % of carboxyl-containing polymerizable unsaturated monomer, (e) 5 to 20 wt. % of hydroxyl-containing polymerizable unsaturated monomer, and (f) 0 to 77.9 wt. % of other polymerizable unsaturated monomer; and (B) 2 to 100 parts by weight of metallic flake pigment.

2. An aqueous metallic coating composition according to claim 1 further containing a film-forming aqueous polyester polymer (C) obtained by neutralizing a carboxyl-containing polyester polymer having a number average molecular weight of 1,000 to 100,000, an acid value of 10 to 50 mg KOH/g and a hydroxyl value of 20 to 150 mg KOH/g.

3. An aqueous metallic coating composition according to claim 1 further containing a compound (D) having two or more alicyclic epoxy groups in the molecule.

4. An aqueous metallic coating composition according to claim 1 further containing a curing agent.

5. A method for forming a topcoat comprising successively forming a colored base coat and a clear coat on a substrate, wherein the colored base coat is formed from an aqueous metallic coating composition according to claim 1.

6. A method according to claim 5, wherein the topcoat is formed by the 2-coat 1-bake technique comprising applying a colored base coat composition to a substrate, applying a clear coat composition to the surface of the uncured colored base coat and curing the two coats by heating.

7. An article coated by a method according to claim 5 or 6.

* * * * *

UNITED STATES PATENT AND TRADEMARK OFFICE
CERTIFICATE OF CORRECTION

PATENT NO. : 6,099,968
DATED : August 8, 2000
INVENTOR(S) : Harakawa et al.

It is certified that error appears in the above-identified patent and that said Letters Patent is hereby corrected as shown below:

Column 7:
The sixth structural formula:

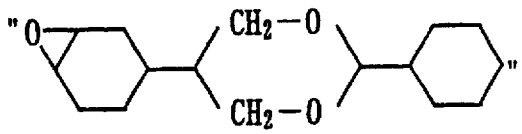

Should read:

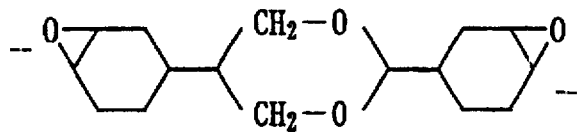

Signed and Sealed this

Thirty first Day of July, 2001

*Attest:*

*Attesting Officer*

NICHOLAS P. GODICI
*Acting Director of the United States Patent and Trademark Office*